United States Patent
Neufeld et al.

(10) Patent No.: US 10,745,791 B2
(45) Date of Patent: Aug. 18, 2020

(54) METHOD OF PRODUCING METAL-COATED STEEL STRIP

(71) Applicant: Bluescope Steel Limited, Melbourne (AU)

(72) Inventors: Aaron Kiffer Neufeld, Figtree (AU); Wayne Andrew Renshaw, Unanderra (AU); Geoff Tapsell, Woonona (AU)

(73) Assignee: Bluescope Steel Limited, Melbourne, Victoria (AU)

( * ) Notice: Subject to any disclaimer, the term of this patent is extended or adjusted under 35 U.S.C. 154(b) by 0 days.

(21) Appl. No.: 16/192,176

(22) Filed: Nov. 15, 2018

(65) Prior Publication Data
US 2019/0085439 A1 Mar. 21, 2019

Related U.S. Application Data

(63) Continuation of application No. 14/436,524, filed as application No. PCT/AU2013/001198 on Oct. 17, 2013, now abandoned.

(30) Foreign Application Priority Data

Oct. 17, 2012 (AU) ............................... 2012904524

(51) Int. Cl.
*C23C 2/12* (2006.01)
*C22C 18/00* (2006.01)
(Continued)

(52) U.S. Cl.
CPC .............. *C23C 2/12* (2013.01); *B32B 15/013* (2013.01); *C22C 18/00* (2013.01); *C22C 18/04* (2013.01);
(Continued)

(58) Field of Classification Search
CPC .. C23C 2/12; C23C 2/28; C22C 21/10; B32B 15/013
(Continued)

(56) References Cited

U.S. PATENT DOCUMENTS 3,553,034 A * 1/1971 Donald et al. .......... C23C 22/30
148/267
4,812,371 A * 3/1989 Shindou .................... C23C 2/06
420/514

(Continued)

FOREIGN PATENT DOCUMENTS

CN 1261614 6/2006
CN 101133178 2/2008
(Continued)

OTHER PUBLICATIONS

International Search Report for PCT/AU2013/001198 dated Feb. 12, 2014 (3 pages).
(Continued)

*Primary Examiner* — Hai Y Zhang
(74) *Attorney, Agent, or Firm* — Michael Best & Friedrich LLP

(57) ABSTRACT

A method of forming a coating of an Al—Zn—Si—Mg alloy on a steel strip to form an Al—Zn—Mg—Si coated steel strip is disclosed. The method includes the steps of dipping steel strip into a bath of molten Al—Zn—Si—Mg alloy and forming a coating of the alloy on exposed surfaces of the steel strip and cooling the coated strip with cooling water. The cooling step includes controlling the pH of cooling water to be in a range of p H 5-9. Particular embodiments focus on Al—Zn—Si—Mg alloys that contain the following elements in % by weight: Zn: 30 to 60, Si: 0.3 to 3, Mg: 0.3 to 10, and Balance Al and unavoidable impurities.

14 Claims, 3 Drawing Sheets

(51) Int. Cl.
*B32B 15/01* (2006.01)
*C23C 2/06* (2006.01)
*C23C 2/28* (2006.01)
*C23C 2/40* (2006.01)
*C22C 18/04* (2006.01)
*C22C 21/10* (2006.01)

(52) U.S. Cl.
CPC ............... *C22C 21/10* (2013.01); *C23C 2/06* (2013.01); *C23C 2/28* (2013.01); *C23C 2/40* (2013.01); *Y10T 428/12972* (2015.01)

(58) Field of Classification Search
USPC ..................................................... 427/398.3
See application file for complete search history.

(56) References Cited

U.S. PATENT DOCUMENTS

| | | | | |
|---|---|---|---|---|
| 4,854,942 | A * | 8/1989 | Denney | B01D 3/06 48/197 R |
| 6,635,359 | B1 | 10/2003 | Kurosaki et al. | |
| 6,677,058 | B1 | 1/2004 | Komatsu | |
| 2010/0181062 | A1* | 7/2010 | McCann | F24F 5/0035 165/287 |
| 2010/0316805 | A1* | 12/2010 | Scott | C23C 2/12 427/374.4 |

FOREIGN PATENT DOCUMENTS

| | | |
|---|---|---|
| EP | 1193323 | 4/2002 |
| JP | S58177446 | 10/1983 |
| JP | 2010106293 | 5/2010 |
| WO | 2007146161 | 12/2007 |
| WO | 2009/097663 | 8/2009 |
| WO | 2010/135779 | 12/2010 |

OTHER PUBLICATIONS

Extended European Search Report for Application No. 13848065.2 dated Sep. 9, 2015 (6 pages).
United States Patent Office Final Rejection for U.S. Appl. No. 14/436,536 dated Feb. 15, 2018, 12 pages.
Chinese Patent Office Action for Application No. 201380053903.X dated May 27, 2017 (44 pages with English Translation).

* cited by examiner

METHOD OF PRODUCING METAL-COATED STEEL STRIP

TECHNICAL FIELD

The present invention relates to the production of metal strip, typically steel strip, which has a coating of a corrosion-resistant metal alloy that contains aluminium-zinc-silicon-magnesium as the main elements in the alloy, and is hereinafter referred to as an "Al—Zn—Si—Mg alloy" on this basis.

In particular, the present invention relates to a hot-dip metal coating method of forming a coating of an Al—Zn—Si—Mg alloy on a strip that includes dipping uncoated strip into a bath of molten Al—Zn—Si—Mg alloy and forming a coating of the alloy on the strip.

Typically, the Al—Zn—Si—Mg alloy of the present invention comprises the following ranges in % by weight of the elements Al, Zn, Si, and Mg:

Zn: 30 to 60%
Si: 0.3 to 3%
Mg: 0.3 to 10%
Balance Al and unavoidable impurities.

More typically, the Al—Zn—Si—Mg alloy of the present invention comprises the following ranges in % by weight of the elements Al, Zn, Si, and Mg:

Zn: 35 to 50%
Si: 1.2 to 2.5%
Mg 1.0 to 3.0%
Balance Al and unavoidable impurities.

The Al—Zn—Si—Mg alloy may contain other elements that are present in the alloy as deliberate alloying additions or as unavoidable impurities. Hence, the phrase "Al—Zn—Si—Mg alloy" is understood herein to cover alloys that contain such other elements as deliberate alloying additions or as unavoidable impurities. The other elements may include by way of example any one or more of Fe, Sr, Cr, and V.

It is noted that the composition of the as-solidified coating of the Al—Zn—Si—Mg alloy may be different to an extent to the composition of the Al—Zn—Si—Mg alloy used to form the coating due to factors such as partixdla dissolution of the metal strip into the coating during the coating process.

Depending on the end-use application, the metal-coated strip may be painted, for example with a polymeric paint, on one or both surfaces of the strip. In this regard, the metal-coated strip may be sold as an end product itself or may have a paint coating applied to one or both surfaces and be sold as a painted end product.

BACKGROUND ART

One corrosion resistant metal alloy coating that is used widely in Australia and elsewhere for building products, particularly profiled wall and roofing sheets, is an Al—Zn alloy coating, more particularly a coating formed from a 55% Al—Zn alloy that also comprises Si in the alloy. The profiled sheets are usually manufactured by cold forming painted, metal alloy coated strip. Typically, the profiled sheets are manufactured by roll-forming the painted strip.

The addition of Mg to this known 55% Al—Zn alloy has been proposed in the patent literature for a number of years, see for example U.S. Pat. No. 6,635,359 in the name of Nippon Steel Corporation.

It has been established that when Mg is included in a 55% Al—Zn alloy coating, Mg brings about certain beneficial effects on product performance, such as improved cut-edge protection.

The applicant has carried out extensive research and development work in relation to Al—Zn—Si—Mg alloy coatings on strip such as steel strip. The present invention is the result of part of this research and development work.

The above discussion is not to be taken as an admission of the common general knowledge in Australia and elsewhere.

SUMMARY OF THE INVENTION

The research and development work that is relevant to the present invention included a series of plant trials on metal coating lines of the applicant to investigate the viability of forming Al—Zn—Si—Mg alloy coatings on steel strip on these metal coating lines. The plant trials found that Al—Zn—Si—Mg alloy coatings are far more reactive with quench water used to cool metal alloy coatings on strip after coated strip leaves molten alloy baths in the metal coating lines than conventional Al—Zn coatings. More particularly, the applicant found that there was greater dissolution of Al—Zn—Si—Mg alloy coatings into quench water than was the case with conventional Al—Zn coatings and the dissolution resulted in precipitates in quench water that caused a rapid deterioration of cooling water circuit heat exchangers and caused undesirable coatings to form on cooling water storage tank surfaces in the quench water circuits in the metal coating lines. The precipitation problem is a potentially serious maintenance issue.

After identifying the precipitate problem and carrying out further research and development work, the applicant found that pH control of cooling water and to a lesser extent cooling water temperature control made it possible to reduce the extent of precipitate formation and allowed the cooling water heat exchangers to perform in a practical manner. More particularly, the applicant found that the precipitate problem could be addressed by suppressing the alkalinity of cooling water via pH control of cooling water and to a lesser extent cooling water temperature control (operating at low temperatures) to thereby reduce the corrosiveness of the cooling water towards Al—Zn—Si—Mg alloy coatings.

According to the present invention there is provided a method of forming a coating of an Al—Zn—Si—Mg alloy on a steel strip to form an Al—Zn—Mg—Si coated steel strip, the method including the steps of dipping steel strip into a bath of molten Al—Zn—Si—Mg alloy and forming a coating of the alloy on exposed surfaces of the steel strip and cooling the coated strip with cooling water, with the cooling step including controlling the pH of cooling water to be in a range of pH 5-9.

The cooling step may include controlling the pH of cooling water to be less than 8.

The cooling step may include controlling the pH of cooling water to be less than 7.

The cooling step may include controlling the pH of cooling water to be less than 7.5.

The cooling step may include controlling the pH of cooling water to be greater than 5.5.

The cooling step may include controlling the pH of cooling water to be greater than 6.

The cooling step may include controlling the temperature of cooling water to be in a range of 25-80° C.

The cooling step may include controlling the temperature of cooling water to be less than 70° C.

The cooling step may include controlling cooling water temperature to be less than 60° C.

The cooling step may include controlling cooling water temperature to be less than 55° C.

The cooling step may include controlling cooling water temperature to be less than 50° C.

The cooling step may include controlling cooling water temperature to be less than 45° C.

The cooling step may include controlling cooling water temperature to be greater than 30° C.

The cooling step may include controlling cooling water temperature to be greater than 35° C.

The cooling step may include controlling cooling water temperature to be greater than 40° C.

The cooling step may include controlling the pH by adding acid to the cooling water.

The cooling step may include controlling the pH by adding acid and other salts, buffers, wetting agents, surfactants, coupling agents, etc.

The acid may be any suitable acid such as phosphoric acid and nitric acid by way of example.

The cooling step may be a water quench step.

The cooling step may be a closed loop in which water is circulated through a circuit that supplies water to the coated strip and collects and cools water and returns the cooled water for cooling the coated strip.

The closed loop may include a water storage tank, a spray system for supplying water to the coated strip from the tank, and a heat exchanger for cooling water after it has been sprayed onto the strip.

The cooling step may be an open loop in which cooling water is not recycled in the cooling step.

The cooling step may include controlling the operating conditions to cool the coated strip to a temperature range of 28-55° C.

The cooling step may include controlling the operating conditions to cool the coated strip to a temperature range of 30-50° C.

The method may include other steps including any one or more of the steps of pre-treating strip to clean the strip before the hot dip coating step, controlling the thickness of the coated strip immediately after the coating step, rolling the coated strip, treating the coated strip with a passivation solution, and coiling the coated strip.

The Al—Zn—Si—Mg alloy may include more than 0.3% by weight Mg.

The Al—Zn—Si—Mg alloy may include more than 1.0% by weight Mg.

The Al—Zn—Si—Mg alloy may include more than 1.3% by weight Mg.

The Al—Zn—Si—Mg alloy may comprise more than 1.5% by weight Mg.

The Al—Zn—Si—Mg alloy may include less than 3% by weight Mg.

The Al—Zn—Si—Mg alloy may include more than 2.5% by weight Mg.

The Al—Zn—Si—Mg alloy may include more than 1.2% by weight Si.

The Al—Zn—Si—Mg alloy may include less than 2.5% by weight Si.

The Al—Zn—Si—Mg alloy may include the following ranges in % by weight of the elements Al, Zn, Si, and Mg:
Zn: 30 to 60%
Si: 0.3 to 3%
Mg: 0.3 to 10%
Balance Al and unavoidable impurities.

The Al—Zn—Si—Mg alloy may include the following ranges in % by weight of the elements Al, Zn, Si, and Mg:
Zn: 35 to 50%
Si: 1.2 to 2.5%
Mg 1.0 to 3.0%
Balance Al and unavoidable impurities.

The Al—Zn—Si—Mg alloy coating may contain other elements that are present as deliberate alloying additions or as unavoidable impurities. The other elements may include by way of example any one or more of Fe, Sr, Cr, and V.

By way of particular example, the other elements may include Ca for dross control in molten coating baths.

The steel may be a low carbon steel.

The present invention also provides an Al—Zn—Mg—Si alloy coated steel strip produced by the above-described method.

The Al—Zn—Si—Mg alloy used to form the coating of the Al—Zn—Mg—Si alloy coated steel strip may include the following ranges in % by weight of the elements Al, Zn, Si, and Mg:
Zn: 30 to 60%
Si: 0.3 to 3%
Mg: 0.3 to 10%
Balance Al and unavoidable impurities.

BRIEF DESCRIPTION OF THE DRAWINGS

The present invention is described further by way of example with reference to the accompanying drawings of which.

DESCRIPTION OF EMBODIMENTS

Figure 1:
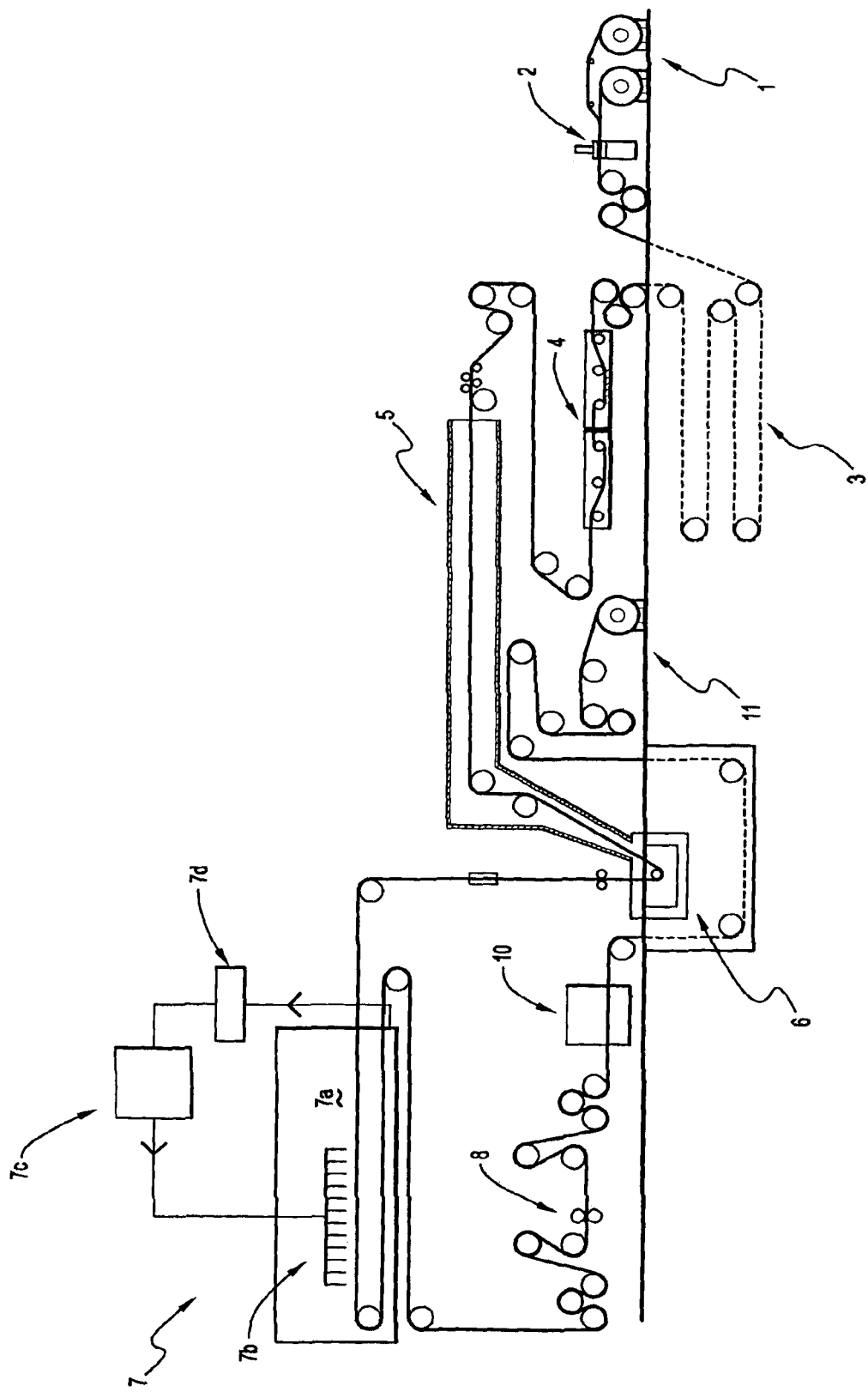
FIG. 1 is a schematic drawing of one embodiment of a continuous metal coating line for forming an Al—Zn—Si—Mg alloy coating on steel strip in accordance with the method of the present invention.

With reference to FIG. 1, in use, coils of cold rolled low carbon steel strip are uncoiled at an uncoiling station 1 and successive uncoiled lengths of strip are welded end to end by a welder 2 and form a continuous length of strip.

The strip is then passed successively through an accumulator 3, a strip cleaning section 4 and a furnace assembly 5. The furnace assembly 5 includes a preheater, a preheat reducing furnace, and a reducing furnace.

The strip is heat treated in the furnace assembly 5 by careful control of process variables including: (i) the temperature profile in the furnaces, (ii) the reducing gas concentration in the furnaces, (iii) the gas flow rate through the furnaces, and (iv) strip residence time in the furnaces (i.e. line speed).

The process variables in the furnace assembly 5 are controlled so that there is removal of iron oxide residues from the surface of the strip and removal of residual oils and iron fines from the surface of the strip.

The heat treated strip is then passed via an outlet snout downwardly into and through a molten bath containing an Al—Zn—Si—Mg alloy held in a coating pot 6 and is coated with Al—Zn—Si—Mg alloy. Typically, the Al—Zn—Si—Mg alloy in the coating pot 6 comprises in % by weight: Zn: 30 to 60%, Si: 0.3 to 3%, Mg: 0.3 to 10%, and balance Al and unavoidable impurities. The coating pot 6 may also contain Ca for dross control in the molten bath. The Al—Zn—Si—Mg alloy is maintained molten in the coating pot at a selected temperature by use of heating inductors (not shown). Within the bath the strip passes around a sink roll and is taken upwardly out of the bath. The line speed is selected to provide a selected immersion time of strip in the coating bath. Both surfaces of the strip are coated with the Al—Zn—Si—Mg alloy as it passes through the bath.

After leaving the coating bath 6 the strip passes vertically through a gas wiping station (not shown) at which its coated surfaces are subjected to jets of wiping gas to control the thickness of the coating.

The exposed surfaces of the Al—Zn—Si—Mg alloy coating oxidise as the coated strip moves through the gas wiping station and a native oxide layer forms on the exposed surfaces of the coating. The native oxide is the first oxide to form on the surface of the metal alloy coating, with its chemical make-up being intrinsically dependent on the composition of the metal alloy coating, including Mg oxide, Al oxide, and a small amount of oxides of other elements of the Al—Zn—Si—Mg alloy coating.

The coated strip is then passed through a cooling section 7 and is subjected to forced cooling by means of a water quench step. The forced cooling may include a forced air cooling step (not shown) before the water quench step. The water quench step is, by way of example, a closed loop in which water sprayed onto coated strip is collected and then cooled for re-use to cool coated strip. The cooling section 7 includes a coated strip cooling chamber 7a, a spray system 7b that sprays water onto the surface of the coated strip as it moves through the cooling chamber 7a, a water quench tank 7c for storing water that is collected from the cooling chamber 7b, and a heat exchanger 7d for cooling water from the water quench tank 7c before transferring the water to the spray system 7b.

In accordance with one embodiment of the present invention (a) the pH of the cooling water supplied to the spray system 7b is controlled to be in a range of pH 5-9, typically in a range of 5-8, more typically in a range of 5.5-7.5 and (b) the temperature of the cooling water supplied to the spray system is controlled to be in a relatively low temperature range of 30-50° C. Both control steps (a) and (b) minimise dissolution of the Al—Zn—Si—Mg alloy coating on the coated strip.

The pH and temperature control may be achieved, by way of example, by using a pH probe and a temperature sensor in an overflow tank of the water quench tank 7c and supplying data from the probe/sensor to a PLC and calculating required acid additions to maintain the pH at predetermined set points for pH and the water temperature, with any acid additions and temperature adjustments being made so that the water in the water quench tank 7c is controlled to the set points for pH and temperature. This is not the only possible option for achieving pH and temperature control.

The pH, temperature, and chemical control may also be achieved by way of example, by using a once through water cooling system where the quench water is not recirculated and the input water has pH and temperature properties as described above.

The cooled, coated strip is then passed through a rolling section 8 that conditions the surface of the coated strip. This section may include one or more of skin pass and tension leveling operations.

The conditioned strip is then passed through a passivation section 10 and coated with a passivation solution to provide the strip with a degree of resistance to wet storage and early dulling.

The coated strip is thereafter coiled at a coiling station 11.

As discussed above, the applicant has conducted extensive research and development work in relation to Al—Zn—Si—Mg alloy coatings on steel strip.

The research and development work included plant trials on metal coating line MCL1 at the Springhill operations of the applicant. The plant trials found that white precipitates formed in the quench system of the line when the line was operating with Al—Zn—Si—Mg alloy as a coating alloy for steel strip. Significantly, it was found that these white precipitates eventually blocked the quench system heat exchanger. The Springhill metal coating lines are similar in general terms to the line shown in FIG. 1 and include a closed loop quench step on each of the three lines (MCL1, MCL2, and MCL3). Each closed loop processes a relatively small volume (approx 5000 L) of water. The cooling water is cooled by dedicated heat exchangers on each line. The white precipitates formed on cooling system equipment surfaces and covered an initial layer of grey material. The grey layer was found to contain $Al(OH)_3$ and $Al_2O_3.3H_2O$ from previous line operations using conventional Al—Zn alloys. The white precipitates were found to contain $Mg_4Al_2(OH)_{14}.3H_2O$ and $Al_2O_3.3H_2O$. These magnesium/aluminium oxy/hydroxides also contained magnesium carbonate compounds.

The plant trials carried out by the applicant comprised initial plant trials on Al—Zn—Si—Mg alloys in two groups of alloy compositions that identified the precipitate problem in the first instance and later more extensive plant trials that confirmed the precipitate problem and evaluated several options to minimise the problem. Group (a) alloys include the following ranges in % by weight of the elements Al, Zn, Si, and Mg: Al: 2 to 19%, Si: 0.01 to 2%, Mg: 1 to 10%, and balance Zn and unavoidable impurities. Group (b) alloys include the following ranges in % by weight of the elements Al, Zn, Si, and Mg: Al: 30 to 60%, Si: 0.3 to 3%, Mg: 0.3 to 10%, and balance Zn and unavoidable impurities.

The following description focuses on the later plant trials.

The later plant trials on the MCL1 line were carried out by hot dip coating steel strip with the following alloys in coating baths: (a) a known Al—Zn alloy (hereinafter referred to as "AZ") and (b) an Al—Zn—Si—Mg alloy (hereinafter referred to as "AM") having the following compositions, in wt. %:

AZ: 55Al—43Zn—1.5Si—0.45Fe-incidental impurities.
AM: 53Al—43Zn—2Mg—1.5Si—0.45Fe-incidental impurities (a group (b) alloy).

The later plant trials on the MCL1 line are summarised below.

Quench System—No Control

The first week of the plant trials on the MLC1 line was run with the AZ (Al—Zn) alloy and produced standard Zincalume (Registered Trade Mark) coated strip. The line was run in accordance with established operating conditions. In terms of the water cooling step on the line, the quench water was at a temperature of 50-60° C. upstream of the water sprays. There was no pH control of the quench water. Under these conditions the quench water became saturated with aluminium and the pH increased to around 8.5 (at 60° C.)

As soon as Mg (and a small amount of Ca for dross control) was added to the metal coating pot to adjust the AZ alloy composition to the AM (Al—Zn—Si—Mg) alloy coating composition the pH started to rise and eventually reached 10.0. The quench water became milky white and the inlet screens to the quench pumps became blocked with milky white precipitates and had to be removed. The quench water was analysed and the results of the analysis are presented in Table 1.

TABLE 1

Quench Tank White Precipitate - AM alloy

| Element | wt % (XRF) | wt % (ICP) |
|---|---|---|
| Al | 21.0 | 24.2 |
| Mg | 8.5 | 10.2 |
| Ca | 2.2 | 2.0 |
| Zn | 0.29 | 0.26 |
| C | 3.1 | — |

A typical Al—Zn scale is almost all aluminium. Consequently, the Table 1 data indicates that a surface layer rich in Mg and Ca was dissolving in the quench water. The proportion of Mg and Ca relative to Al in the quench deposits was much higher than in the metal pot. The presence and quantity of carbon in Table 1 also indicated that both Ca and Mg were forming carbonates in the quench water. The white precipitates were found to contain $Mg_4Al_2(OH)_{14} \cdot 3H_2O$ and $Al_2O_3 \cdot 3H_2O$. These magnesium/aluminium oxy/hydroxides also contained magnesium carbonate compounds.

The presence of the white precipitate in the quench water caused the quench heat exchanger to become blocked quickly. When operating with conventional Al—Zn alloy compositions, the quench heat exchanger on the line would typically last 9 months. The presence of magnesium and calcium made a significant change to the surface characteristics of the coated strip and increased the dissolution of the oxide layer during the water cooling step.

The applicant considered a range of options to prevent or minimise the dissolution for the AM Al—Zn—Si—Mg alloy coating. The applicant settled on a strategy of suppressing the alkalinity of cooling water via pH control of cooling water and to a lesser extent cooling water temperature control to thereby reduce the corrosiveness of the cooling water towards Al—Zn—Si—Mg alloy coatings. The plant trials tested two options, namely pH control and cooling water temperature control, as discussed below.

Quench System—pH Control

A trial to control quench tank pH using phosphoric acid ran for 4 days. The control system was set to allow a predetermined $[OH^-]$ ion value of $1.0 \times 10^{-6}$ mol/L.

Table 2 provides the values of the pH set point for different water quench tank temperatures to maintain a set pH.

TABLE 2

Quench Tank pH requirements for constant [OH⁻] concentration

| Temp (° C.) | pH Set point |
|---|---|
| 35 | 7.68 |
| 40 | 7.53 |
| 45 | 7.39 |
| 50 | 7.26 |
| 55 | 7.14 |
| 60 | 7.02 |
| 65 | 6.90 |
| 70 | 6.80 |

The pH and the concentration of the dosing acid were 1.6 and 53.6 g/L $H_3PO_4$ respectively. During the trial the dosing acid consumption was quite low, approximately 17 L/day, or less than about 1 L/day of concentrated phosphoric acid (85 wt %). Quench tank dosing proved effective at controlling white precipitate formation and preventing quench heat exchanger blockage. Another outcome of pH dosing was that the pH probe did not foul.

Quench System—Low Temperature Control

At the end of the above-described pH control trial period, the set point temperature for the quench tank sprays was lowered 50° C. to 35° C., and pH dosing was discontinued. The quench tank was flushed with water to remove residual salts from the pH control trial. This change caused wet strip conditions further downstream but it also showed that temperature is an important variable for quench tank control. During the period of the low temperature operation (24 hours) there was no increase in differential pressure across the quench tank heat exchanger. The quench tank temperature was typically 15° C. higher than the spray temperature. During the low temperature trial the quench tank temperature was 48-50° C. rather than the 65-70° C. typical of normal MCL1 quenching conditions.

After 24 hours the set point was increased to 50° C. to determine whether temperature is a critical variable. The quench heat exchanger differential pressure started to increase immediately—indicating the formation of precipitates in the heat exchanger.

After 10 hours the set point was lowered to 40° C. but this seemed to have little impact. When the quench heat exchanger differential pressure reached 110 kPa the set point was returned to 50° C. and the quench tank was dosed with acid to bring the pH down and pH control was reactivated. Dosing was left on during the run down of the pot in the final days of the trial. The quench water became clear and the quench heat exchanger differential pressure stabilised during this time.

Quench Water Analysis

Samples of quench water were collected and analysed during the trials. The results are shown in FIGS. 2 and 3.

Figure 2:
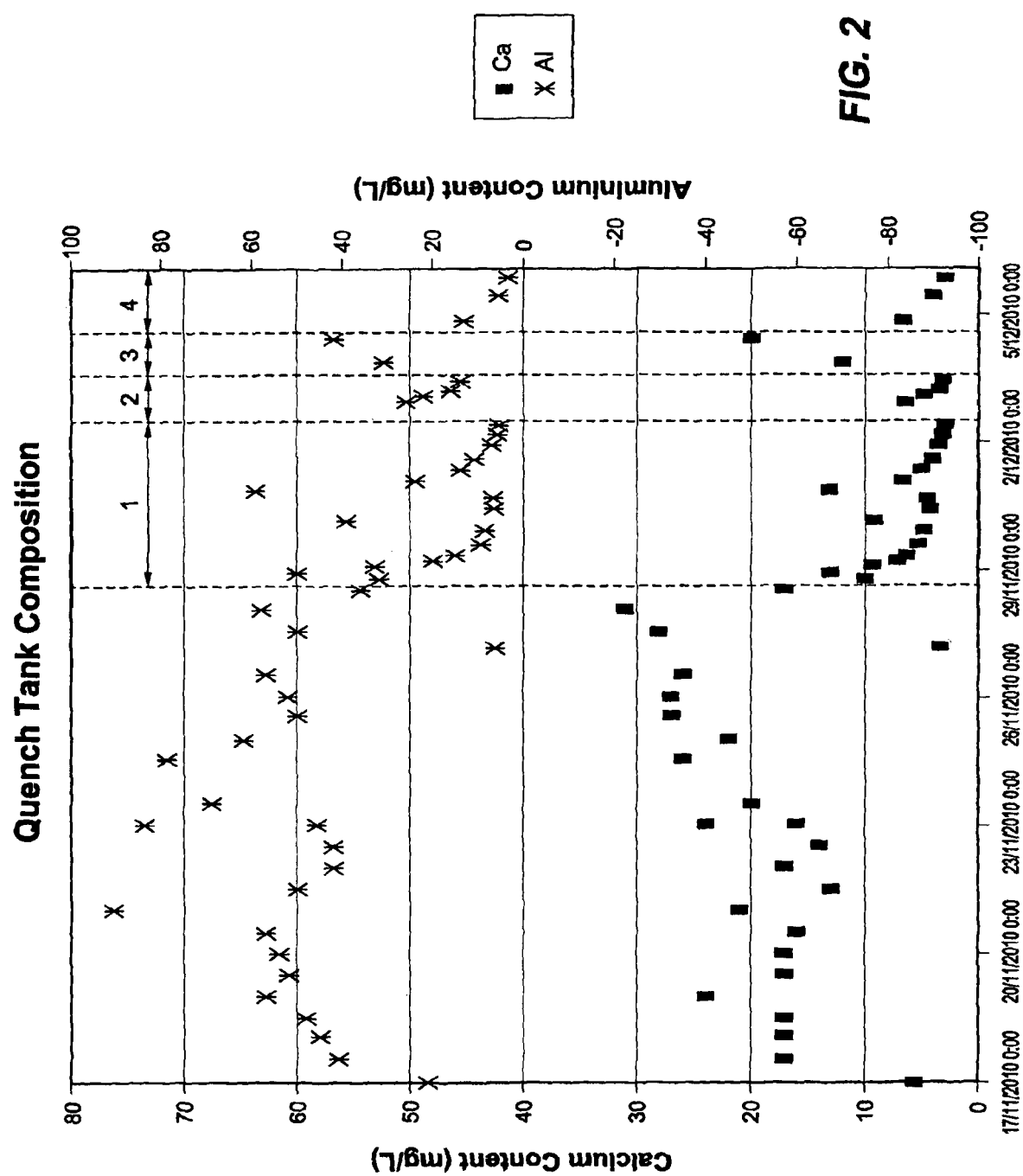
FIG. 2 is a graph of the Al and Ca concentrations in cooling water used during the course of a plant trial carried out by the applicant.
Figure 3:
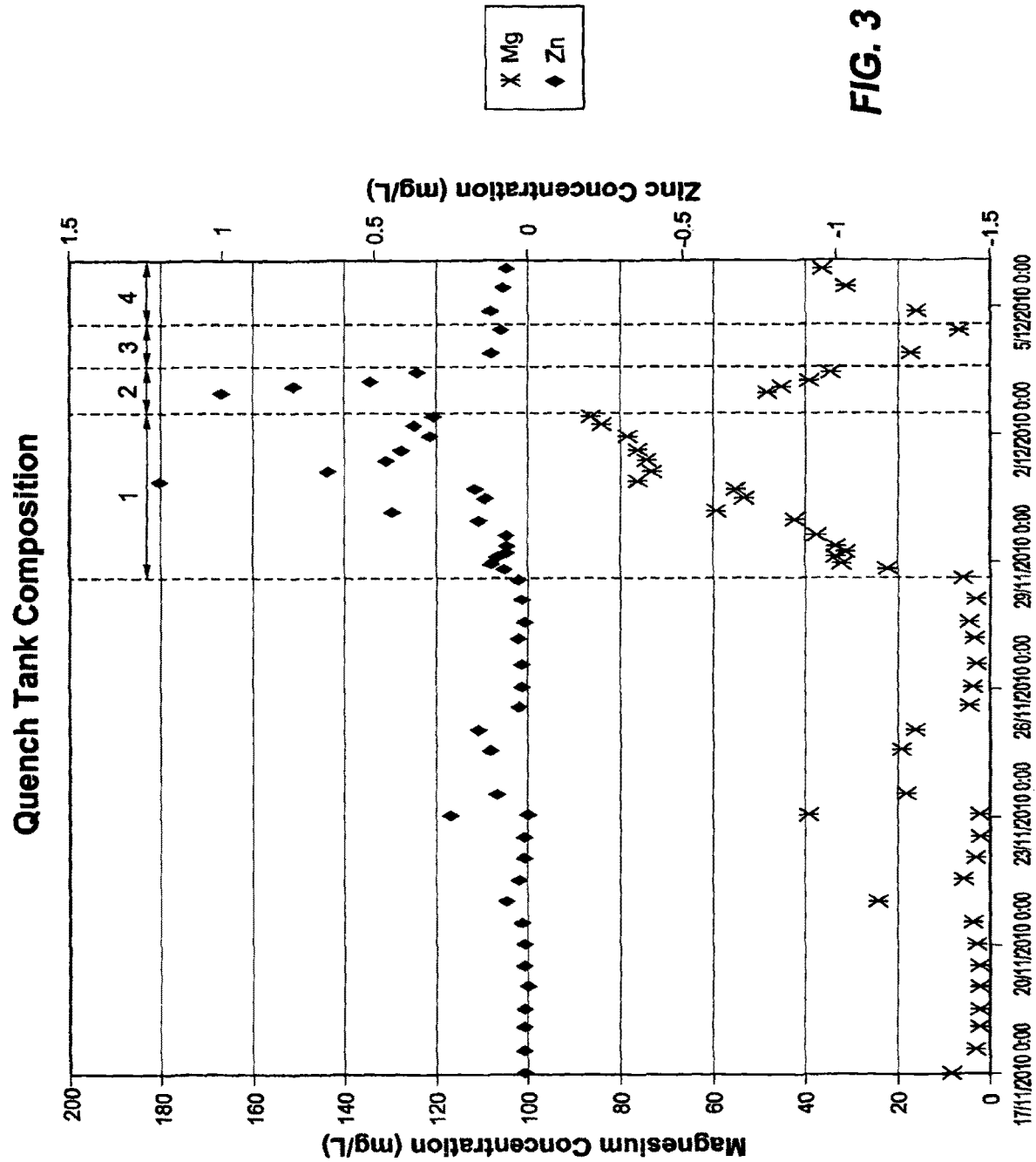
FIG. 3 is a graph of the Mg and Zn concentrations in cooling water used during the course of the plant trial carried out by the applicant.

In FIGS. 2 and 3 the periods 1-4 represent pH control (1), low temperature control (35° C.) (2), quench tank set point at 50° C. (3), and quench tank set point at 40° C., respectively.

With reference to the Figures, both aluminium and calcium seem to follow the same trend (FIG. 2). Lower quench tank temperature and pH dosing lowered the level of these ions in the quench water, with the calcium levels dropping substantially. Without control the level of Al in the quench water is considerably higher for Al—Zn—Si—Mg alloy coatings than Al—Zn alloy coatings (typical Al—Zn concentrations in quench water are 4-20 mg/L). The impact of pH control on magnesium concentration is shown in FIG. 3. It increased considerably during the 4 day test period. Increased magnesium levels are also evident for cooler quench tank conditions. Zinc levels also increased during pH control and for the coldest quench tank trial (35° C.) but was still at low levels overall.

Conclusions

The above trials and other research and development work of the applicant established that Al—Zn—Si—Mg alloy coated strip is far more reactive in cooling water than Al—Zn alloy coated strip and lead to rapid deterioration of the quench heat exchangers and coatings of the quench tank surfaces, with the higher reactivity being due in large part to magnesium and calcium. Lower quench tank temperatures and pH control reduced the impact of magnesium and calcium dissolution in the quench water and allowed the quench heat exchangers to perform in a practical manner.

Many modifications may be made to the present invention described above without departing from the spirit and scope of the invention.

By way of example, whilst the embodiment of the metal coating line shown in FIG. 1 includes a coated strip cooling section 7 that includes water sprays, the present invention is not so limited and extends to any suitable water cooling system, such as dunk or immersion tanks.

The invention claimed is:

1. A method of forming an Al—Zn—Si—Mg alloy coating on a steel strip wherein the Al—Zn—Si—Mg alloy including the following ranges in % by weight of the elements Al, Zn, Si, and Mg:
   Zn: 35 to 50%
   Si: 1.2 to 2.5%
   Mg: 1.0 to 3.0%
   optionally other deliberate alloying additions:
   Balance Al and unavoidable impurities, the method including the steps of
   dipping the steel strip into a bath of molten Al—Zn—Si—Mg alloy and forming a coating of the alloy on exposed surfaces of the steel strip, cooling the coated strip with cooling water,
   conditioning the surface of the coated strip in a rolling section, and passivating the surface of the coated strip to provide resistance to wet storage and early dulling by coating the strip with a passivation solution in a passivation section, with cooling step including:
   controlling the pH of cooling water to be in a range of pH 5-9;
   controlling the temperature of cooling water to be in a range of 25-80° C.;
   a water quench step and (a) a closed loop in which water is circulated through a circuit that supplies the cooling water that is sprayed onto the coated strip and collects and cools water and returns the cooled water for cooling the coated strip or (b) an open loop in which cooling water is supplied from a cooling tower and sprayed onto the coated strip and collected and recirculated through the cooling tower.

2. The method defined in claim 1, wherein the cooling step includes controlling the pH of cooling water to be in a range of pH 5-8.

3. The method defined in claim 1, wherein the cooling step includes controlling the pH of cooling water to be in a range of pH 5-7.

4. The method defined in claim 1, wherein the cooling step includes controlling the pH of cooling water to be in a range of pH 6-9.

5. The method defined in claim 1, wherein the cooling step includes controlling cooling water temperature to be in a range of 30° C.-80° C.

6. The method defined in claim 1, wherein the cooling step includes the closed loop and not the open loop.

7. The method defined in claim 1, wherein the cooling step includes the open loop and not the closed loop.

8. The method defined in claim 1, wherein the cooling step includes controlling the temperature of cooling water to be in a range of 25-70° C.

9. The method defined in claim 1, wherein the cooling step includes controlling the temperature of cooling water to be in a range of 25-55° C.

10. The method defined in claim 1, wherein the cooling step includes controlling the temperature of cooling water to be in a range of 25-45° C.

11. The method defined in claim 1, wherein the cooling step includes controlling the operating conditions to cool the coated strip to a temperature range of 30-55° C.

12. The method defined in claim 1, wherein the Al—Zn—Si—Mg alloy includes 1.3% to 3.0% by weight Mg.

13. The method defined in claim 1, wherein the Al—Zn—Si—Mg alloy includes 1.5% to 3.0% by weight Mg.

14. The method defined in claim 1, wherein the Al—Zn—Si—Mg alloy includes 2.5% to 3.0% by weight Mg.

* * * * *